United States Patent [19]
Nishikubo et al.

[11] Patent Number: 6,084,640
[45] Date of Patent: Jul. 4, 2000

[54] HISTOGRAM CHIP FOR LINE SUMMING, LINE GRABBING AND HISTOGRAMMING IN A THERMAL IMAGING SYSTEM

[75] Inventors: Sam S. Nishikubo, Gardena; Jon J. Nagareda, Palo Alto; Christopher S. Jones, Los Angeles, all of Calif.

[73] Assignee: Raytheon Company, Lexington, Mass.

[21] Appl. No.: 08/604,043

[22] Filed: Feb. 20, 1996

Related U.S. Application Data

[60] Provisional application No. 60/004,875, Sep. 29, 1995.

[51] Int. Cl.$^7$ ............................. H04N 5/14; G06K 9/00
[52] U.S. Cl. ..................... 348/571; 348/672; 348/164; 382/168
[58] Field of Search .................... 348/571, 672, 348/116, 119, 169, 167, 162, 164, 166, 168; 382/168, 164, 170, 171, 172; H04N 5/14

[56] References Cited

U.S. PATENT DOCUMENTS

| | | | |
|---|---|---|---|
| 5,034,817 | 7/1991 | Everett, Jr. ........................ | 358/160 |
| 5,140,649 | 8/1992 | Kageyama ......................... | 382/167 |
| 5,249,241 | 9/1993 | Silverman et al. ................ | 382/51 |
| 5,490,222 | 2/1996 | Sugimoto .......................... | 382/168 |
| 5,663,563 | 9/1997 | Herbst et al. ..................... | 250/332 |

FOREIGN PATENT DOCUMENTS

| | | | |
|---|---|---|---|
| 0-363209 | 4/1990 | European Pat. Off. | ......... H04N 5/33 |
| 2-112602 | 7/1983 | United Kingdom | ............. H04N 1/41 |

OTHER PUBLICATIONS

A. J. McCollum et al., "A Histogram Modification Unit for Real–time Image Enhancement"; Computer Vision Graphics and Image Processing, vol. 42, No. 1, Apr. 1, 1988, pp. 387–398.

*Primary Examiner*—Michael H. Lee
*Attorney, Agent, or Firm*—Colin M. Raufer; Leonard A. Alkov; Glenn H. Lenzen, Jr.

[57] ABSTRACT

A time shared histogram chip (80) implemented in a system for manipulating video signal data. The system includes a processor (82) for controlling system operation and for processing a video signal input into the system. The time shared histogram chip (80) accumulates video signal data in a format readable by the processor (82). The histogram chip (80) is operative to perform histogramming, video line summing and video line grabbing functions. Control means (100) is operatively connected to the processor and enables the processor (82) to selectively control the mode of operation of the histogram chip (80).

2 Claims, 7 Drawing Sheets

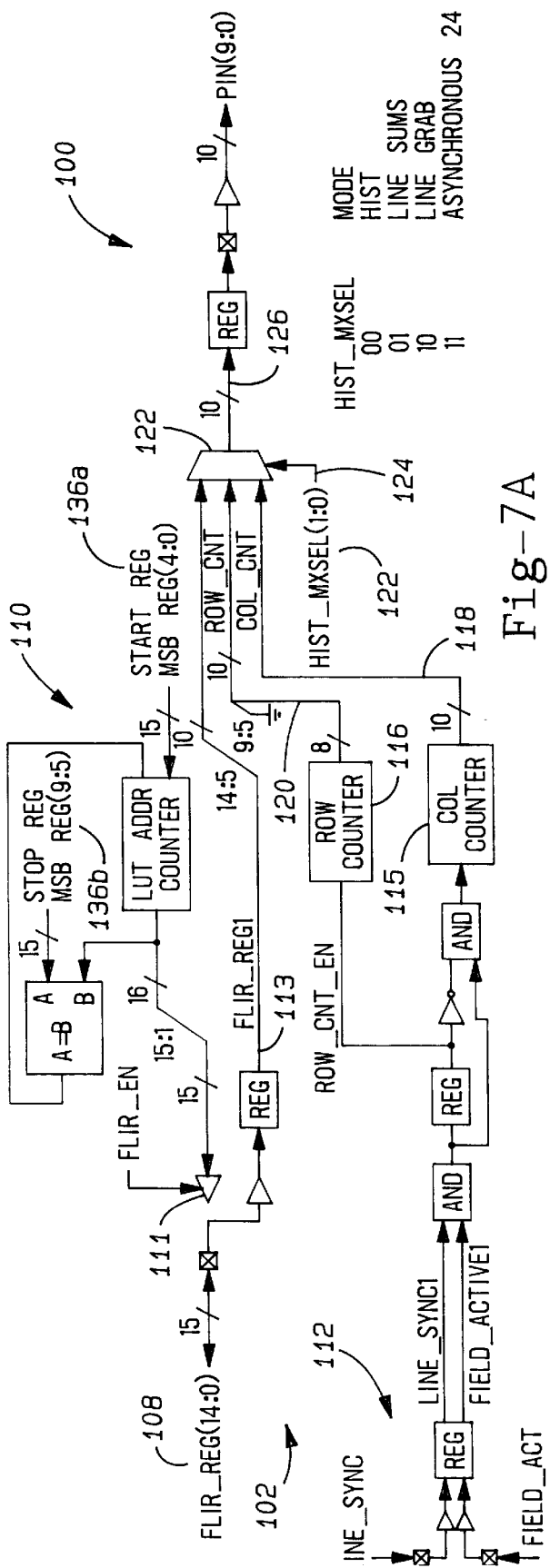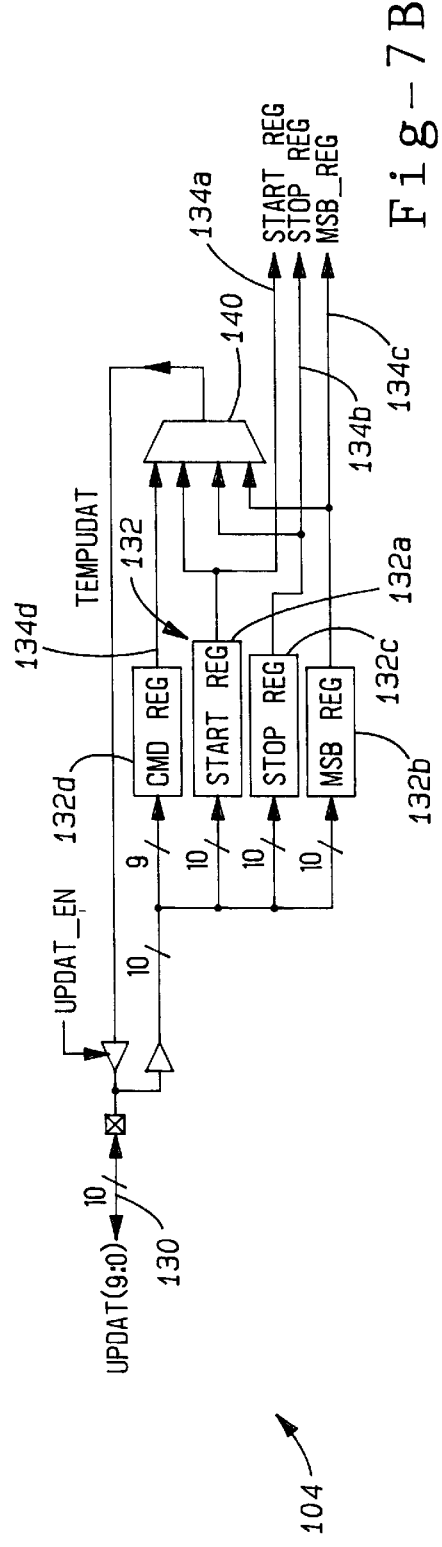
Fig-7A
Fig-7B

HISTOGRAM CHIP FOR LINE SUMMING, LINE GRABBING AND HISTOGRAMMING IN A THERMAL IMAGING SYSTEM

This application is based upon Provisional Application No. 60/004,875 filed Sep. 29, 1995, the priority of which is hereby claimed.

BACKGROUND OF THE INVENTIONS

1. Technical Field

The present invention relates generally to thermal imaging systems, and in particular to a time shared histogram chip that provides line summing, line grabbing and histogramming functions for video signal processing purposes.

2. Discussion

Scanning thermal imaging systems are used in a variety of applications, including surveillance systems and target detection/recognition systems. Such systems typically incorporate a telescopic lens assembly coupled to a scanner. The scanner scans energy from a scene through an imager lens assembly onto a detector array having a plurality of photoelectrically responsive detector elements perpendicular to the scan direction. Each of these detector elements provides an electric signal proportional to the flux of infrared light on the particular detector element. Electric signals generated from the detector elements are subsequently processed by system sensor electronics to create an image that is displayed on a system output device. To improve sensitivity, some of these systems incorporate detectors parallel to the scan direction. The output of these detectors are delayed in time from each other such that, ideally, the scanned image is output simultaneously on all of the parallel detectors. The delayed outputs are then summed (integrated). This process is referred to as time delay and integrate (TDI).

In the above-mentioned thermal imaging systems, the system sensor electronics process signals from the detector element to provide a clean output video signal to the system output device. An important component in the system electronics includes a histogram chip that collects and manipulates data taken from the video signal to allow the processor to look at the data and thereby control the video data compression functions. Associated system hardware performs line summing functions to correct channel-to-channel imbalances and to ensure detector element outputs are equal in voltage level and voltage gain. System hardware also performs video signal line grabbing functions to correct pixel misalignment associated with each of the channels output from the detector array to ensure that pixels across the output display in one row are aligned with pixels in adjacent rows.

While the prior thermal imaging systems exhibit adequate performance characteristics, there is room for advancement in the art. In particular, present design specifications require that more thermal imaging-based applications be implemented in smaller and smaller footprints. Therefore, there is a need to consolidate the separate functions of prior histogram chip and system hardware components into a smaller package. In addition, such thermal imaging systems have a relatively high associated cost of implementation due to the numerous hardware and software-based components required for implementation. Further, there is the ongoing need to increase system accuracy as much as possible.

What is needed then is a time-shared histogram chip that is capable of performing histogramming, line summing and line grabbing functions, thereby minimizing system cost and complexity and at the same time enhancing overall system accuracy.

SUMMARY OF THE INVENTION

In accordance with the teachings of the present invention, a histogram chip is provided for use in thermal imaging systems that is capable of performing multiple functions previously performed by separately implemented hardware components. The histogram chip of the present invention thereby eliminates the need for these separate hardware components and thus reduces system cost. In addition, the histogram chip of the present invention, by eliminating previously needed hardware components, may thus be implemented in a smaller footprint, thereby leaving additional room for other thermal imaging system applications. The histogram chip of the present invention, through its unique method of implementation, further increases overall system accuracy.

In particular, the present invention provides a system for manipulating video signal data. The system includes a processor for controlling system operation and for processing a video signal input into the system. A histogram chip collects video signal data and accumulates data in a format readable by the processor. The histogram chip is operative to perform histogramming, video line summing and video line grabbing functions. Further, a histogram chip mode controller is associated with the processor for controlling the selection by the processor of the histogram chip mode of operation.

BRIEF DESCRIPTION OF THE DRAWINGS

Other objects and advantages of the invention will become apparent upon reading the following detailed description and upon reference to the drawings, in which:

FIGS. 7A–7B are schematic diagrams illustrating the system hardware of the present invention used to control the histogram mode of operation.

DETAILED DESCRIPTION OF THE PREFERRED EMBODIMENT

The following description of the preferred embodiments is merely exemplary in nature and is in no way intended to limit the invention or its application or uses.

Figure 1:
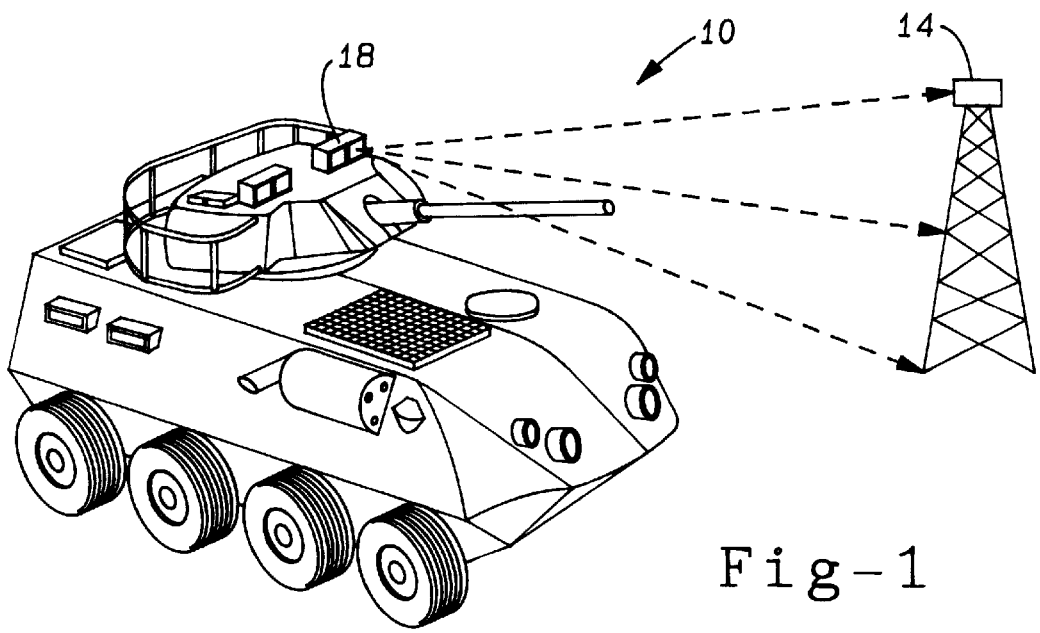
FIG. 1 illustrates an LAV-25 light armored vehicle in which the present invention may be implemented.
Figure 2:
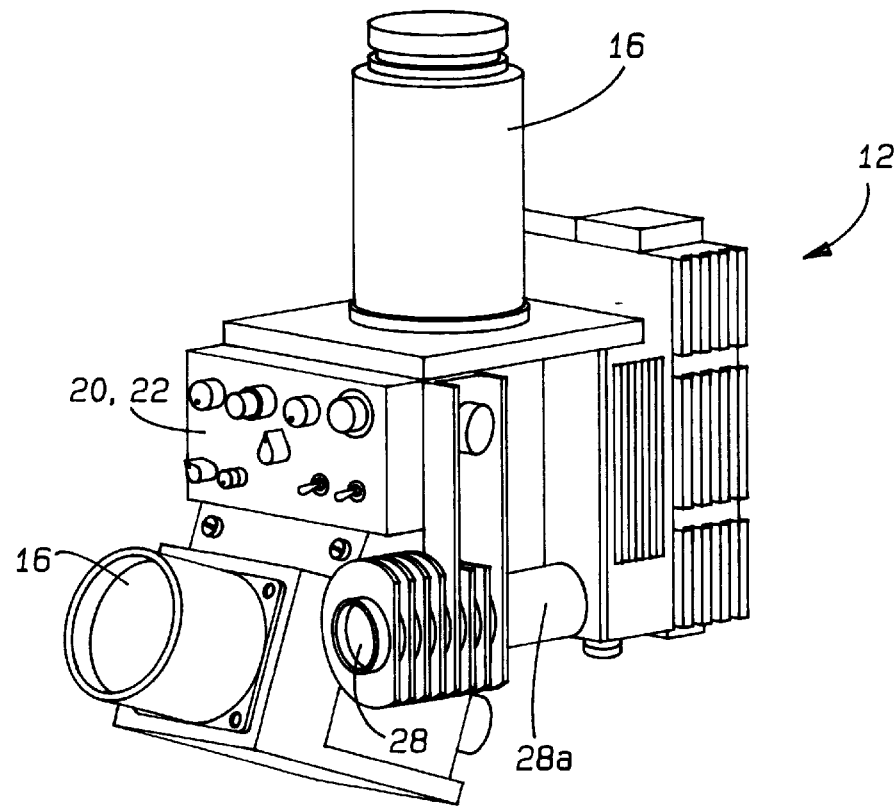
FIG. 2 is a perspective view of a thermal imaging system unit in which the preferred embodiment of the resent invention is implemented.

Referring to the drawings, FIG. 1 shows an LAV-25 light armored vehicle 10 in which the preferred embodiment of the present invention is implemented. As shown in FIGS. 1 and 2, the present invention is implemented as part of a thermal imaging unit 12, which processes energy reflected from a detected target scene 14 back through a system telescope assembly 16 coupled to an externally mounted head mirror 18.

Preferably, the thermal imaging unit 12 is a Hughes Infrared Equipment (HIRE) thermal imaging sensor unit. The HIRE unit is a high performance light weight modular fire control sight and thermal imaging system that is capable of providing superior vision capability through total darkness, smoke, dust, and other types of adverse conditions. The HIRE system may be implemented in a wide variety of environments, including in a variety of armored vehicles, such as the LAV-25, Piranha, Desert Warrior, and LAV-105. The thermal imaging unit 10 provides stand alone thermal imaging capability, but can also be configured for use with TOW missile fire control systems.

The unit incorporates several commercially available major components, thereby reducing logistics requirements through commonality of such things as repair facilities, support equipment, training programs and spare parts. The EFL compensator of the present invention enables the thermal imaging sensor unit to provide a significant improvement in imaging unit image quality and range performance over conventional thermal imaging systems as will now be described.

Referring to FIGS. 1–5, the telescope assembly 16, through which target searching and sighting functions are achieved, is implemented in a protected environment within the vehicle 10. Preferably, the telescope assembly 16 may be selectively switched to either a narrow field of view or a wide field of view as desired through switches on the gunner and commander control panels 20, 22. The head mirrors 18 are implemented to relay a detected scene to the telescope assembly 16. Subsequent to target scene thermal energy signal being processed by the thermal imaging unit, as will be described below, the scene is viewed through a gunner display 19 operatively coupled to a display control panel 20 and a commander display 21 coupled to a commander display control panel 22.

Figure 3:
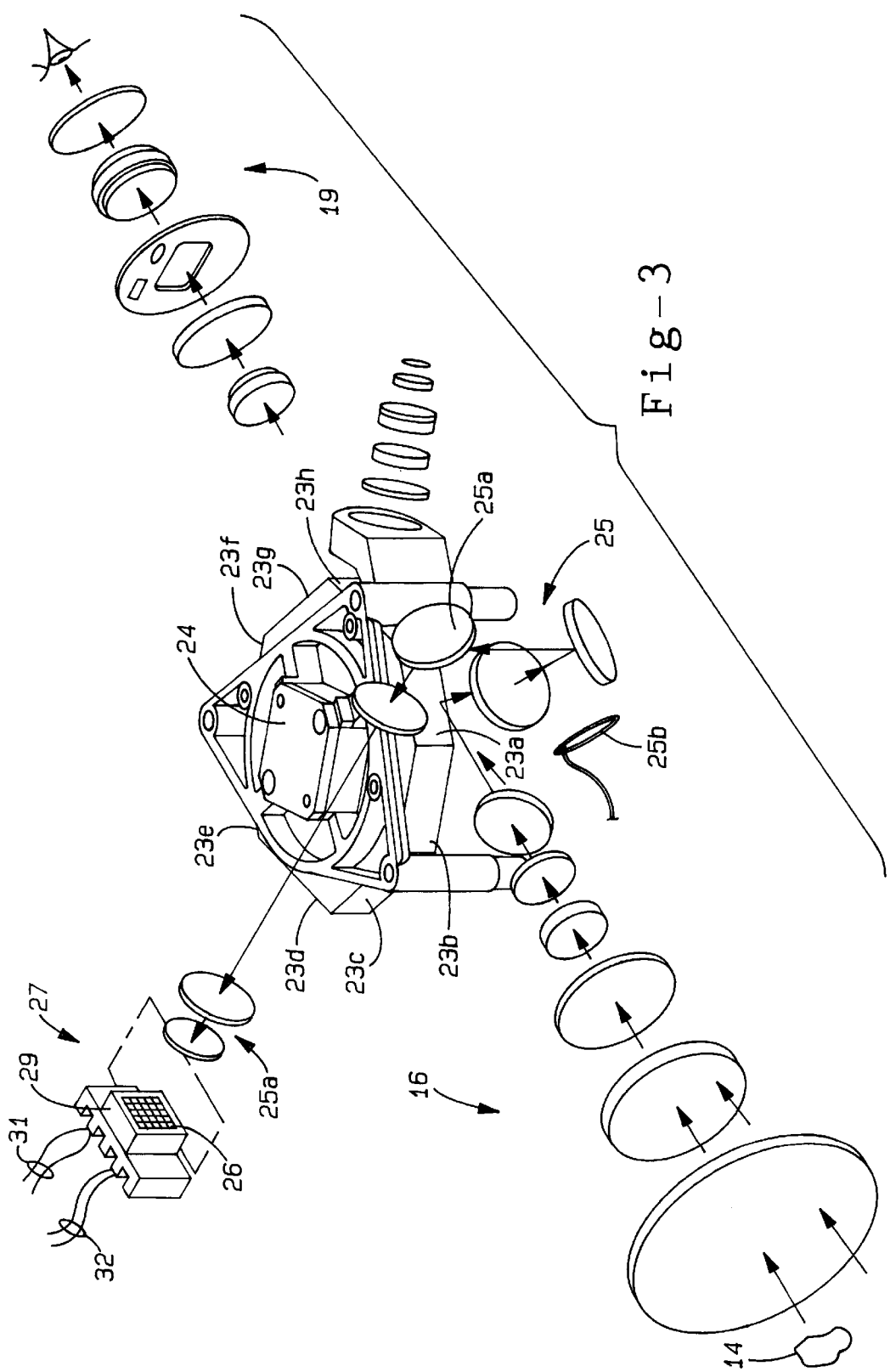
FIG. 3 is a partial exploded view of the thermal imaging optical and detector system shown in FIG. 2.

As shown in FIG. 3, energy from the detected scene is transmitted through the thermal imaging unit 12 to a polygonal, mirrored scanner 23 rotated by a scanner motor 24. The scanner includes 8 facets 23a–23h, each of which is cut at an angle to effect displacement of the scanned scene energy on the detector array by a discrete amount. The cut and displacement effected by each facet is shown below:

TABLE I

| FACET | CUT | DETECTOR ARRAY ENERGY DISPLACEMENT (IN PIXELS) |
| --- | --- | --- |
| 23a | Normal | 0 |
| 23b | Interlaced | −½ |
| 23c | Up | +1 |
| 23d | Interlaced | −½ |
| 23e | Down | −1 |
| 23f | Interlaced | −½ |
| 23g | Normal | 0 |
| 23h | Interlaced | −½ |

As the scanner rotates, the scanner mirrors reflect the scene energy at successively varying angles through an imager assembly shown generally at 25. The imager assembly includes imager lenses, such as lens 25a, which image the scene onto a detector array 26 housed within a detector assembly 27. The imager assembly 25 also includes an imager optics temperature sensor 25b for monitoring the temperature of the imager. The detector assembly 27 is housed within a dewar 28 and cooled by a cooler 28a to cryogenic temperatures. A cold shield 29 housed within the dewar 28 limits the thermal energy that can be seen by the detector such that the detector elements only detect scene energy input through the telescope assembly optics and not other peripheral forms of energy input into the system, such as energy from the warm sides of the housing. The cold shield thereby reduces input noise and thereby improves overall system image quality.

Figure 4:
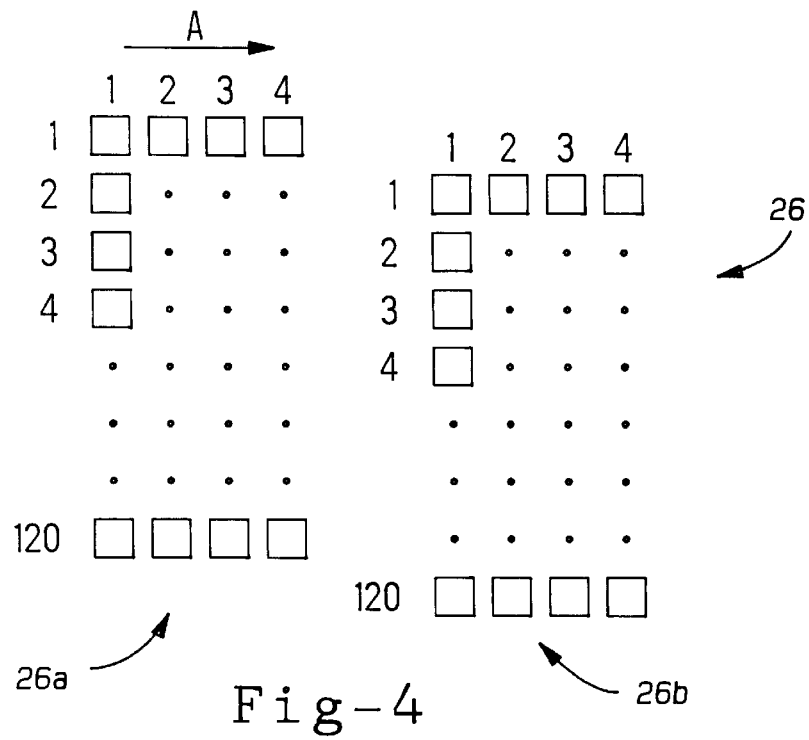
FIG. 4 illustrates the arrangement of the detector assembly elements shown partially in FIG. 3.

As shown partially in FIG. 3 and more fully in FIG. 4, the detector array 26 of the present invention consists of two staggered 120×4 subarrays 26a, 26b of detector elements, with each element being sensitive to light in the infrared spectrum and each having a detector element output. As the scanner scans the image of the scene across the detector in the direction indicated by the arrow A shown in FIG. 4. The output of each detector element is input to a readout integrated circuit (ROIC) 27a (FIG. 5) associated with the detector assembly which samples the output, provides the time delay and integration (TDI) of the four parallel detector elements in each detector element row, and multiplexes the 240 resulting TDI detector channels into 4 video output channels 31, 32, with output channels 31 carrying output signals from the first 120×4 detector subarray 26a, and output channels 32 carrying output signals from the second detector subarray 26b. The ROIC includes a TDI clock 27b that determines when the detector outputs are sampled at the TDI, a multiplexer 27c, and a higher speed detector clock 27d for the ROIC multiplexer, which preferably has a minimum 60:1 sample period.

In the preferred embodiment, the 4 multiplexed output channels of the detective assembly are further multiplexed into one channel by the signal processing electronics at the input high speed clock (HCLK) rate which preferably has a minimum 240:1 sample period and is associated with system electronics described below in reference to FIG. 6. The EFL compensator of the present invention varies the sample rate of the DCLK 27d to control the sample rate of the TDI clock 27b.

Presently implemented detector arrays typically feature 60 to 120 detector elements, with each having an associated output wire. Thus, the detector array of the present invention exhibits higher resolution due to the additional detector elements. Further, the detector array of the present invention utilizes multiplexed detector array output lines, thereby minimizing detector element output wires and thus minimizing area required to implement the array and facilitating ease of assembly and repair.

Figure 5:
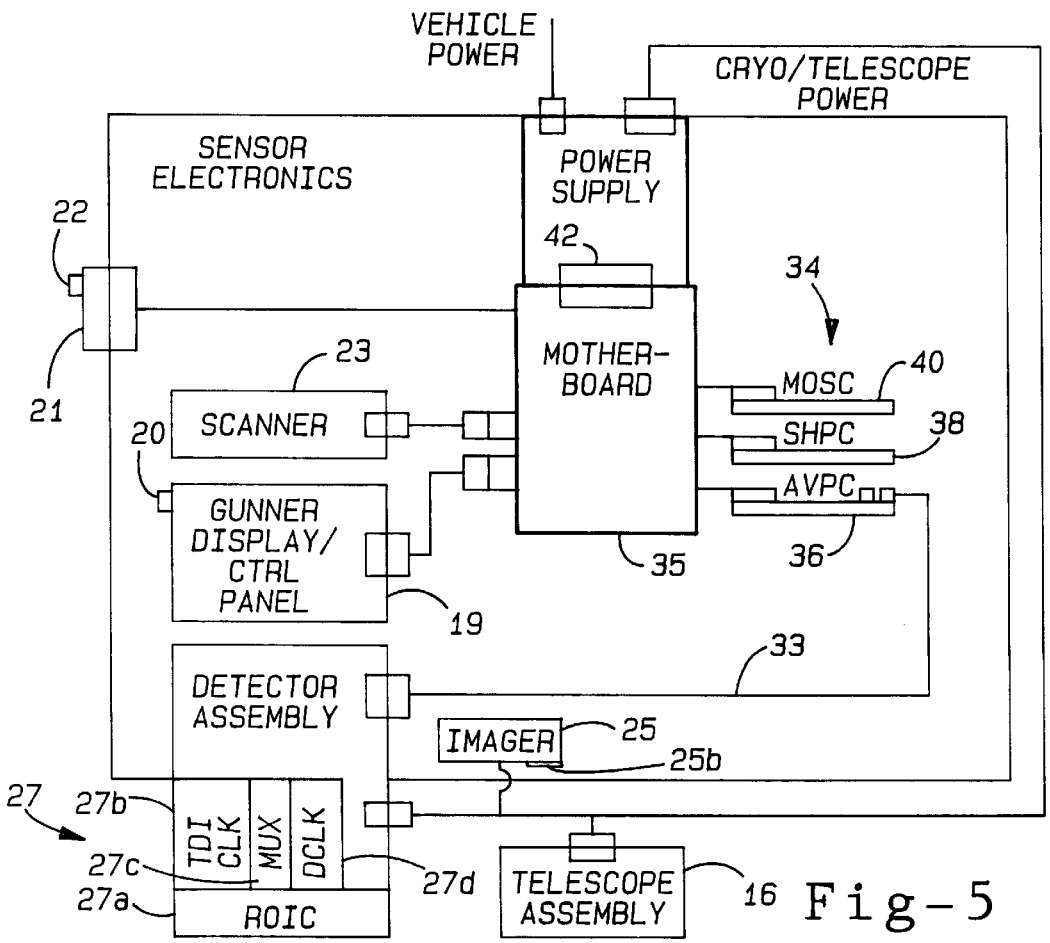
FIG. 5 is a block diagram of the thermal imaging system unit shown in FIG. 2.

Referring now to FIG. 5, operation of the imaging system components is controlled generally by the system electronics 34. The system electronics 34 are implemented on three cards coupled to a system mother board 35. The cards include an analog video processing card (AVPC) 36, a scene based histogram processor card (SHPC) 38 and a memory output symbology card (MOSC) 40. The associated functions of each of these cards will be discussed in greater detail below. Also coupled to the mother board 35 is a power supply card 42 that receives power input from the vehicle in which the system is implemented and outputs power to various system components at voltage levels required by the individual system components.

Figure 6:
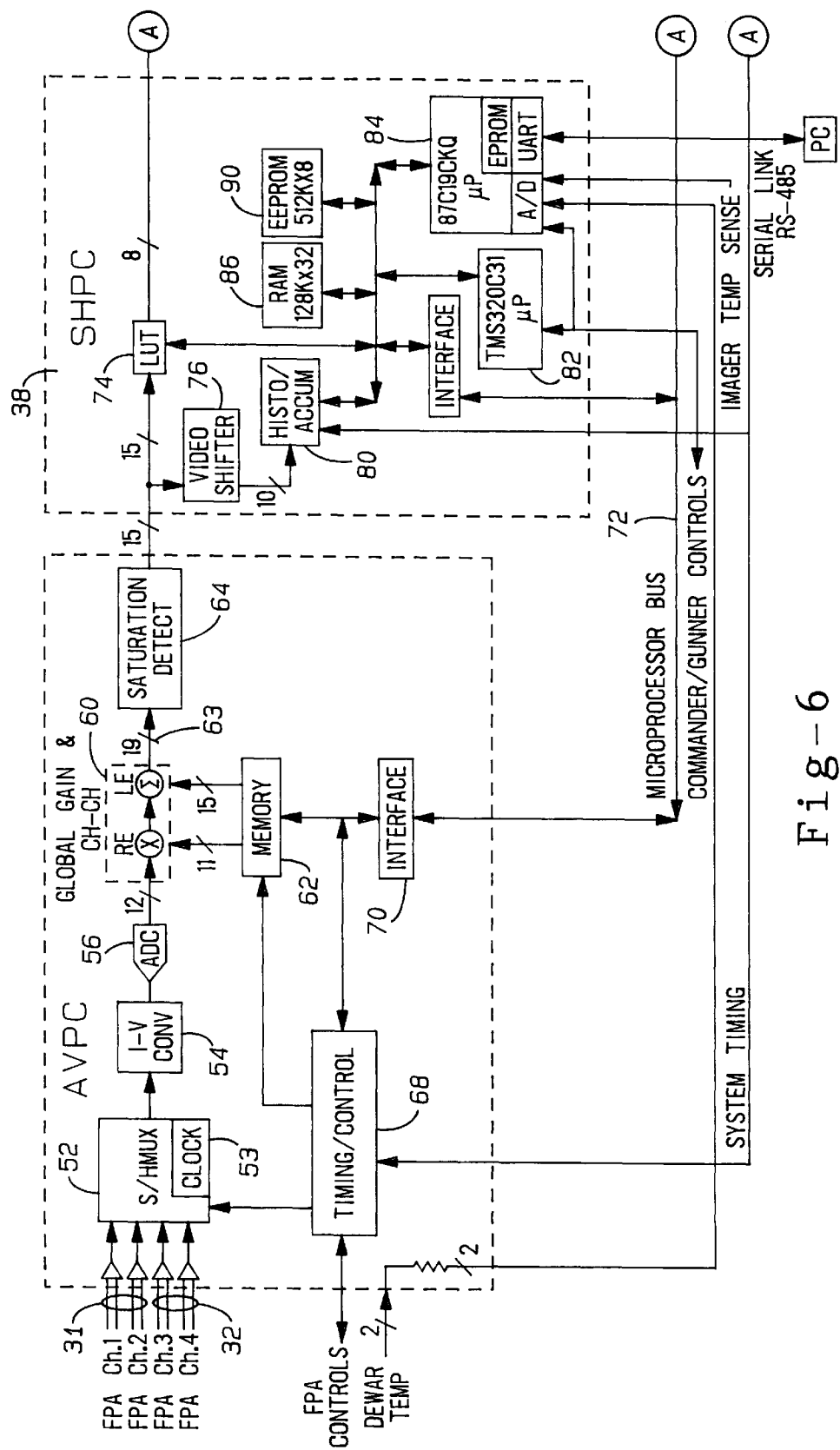
FIGS. 6–6A are block schematic diagrams of system electronics of the thermal imaging system of the present invention.
Figure 6A:
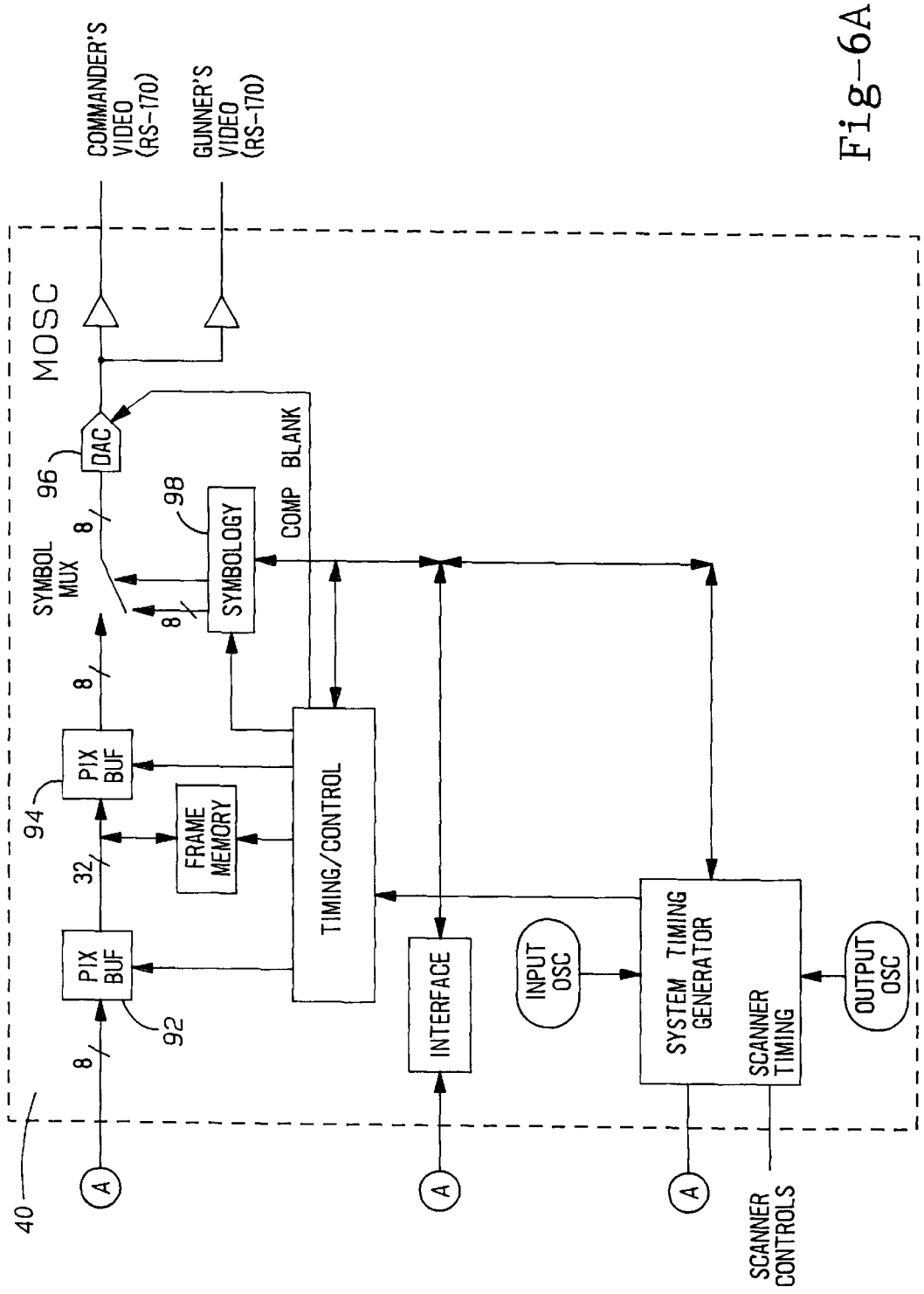

Referring now in detail to FIG. 6, an overall block diagram showing the components implemented on the three cards 36, 38 and 40 shown. Referring first to the AVPC card 36, channel outputs 31, 32 are input into an S/HMUX 52 having an associated high speed system multiplier clock (HCLK) 53. Preferably, all 960 detector elements (240 pixels) are clocked during the clock sample period. The S/HMUX 52 is preferably a HUGHES custom integrated circuit, Part No. 6364060PGA-DEV, designed to sample and further multiplex the multiplexed detector element outputs. These multiplexed signals are sampled at an adjustable sample rate. However, for further signal processing, the signals are converted to voltage signals through I–V converter 54. Once these signals are converted, the signals are digitized by an analog to digital converter 56.

After being converted into digital signals, the detector element output signals are input into a signal equalizer 60. The signal equalizer 60 adds an associated gain and level value, stored in a memory 62, for each one of the 240 detector pixel elements to correct any gain and level differences from each of the detector pixel signals so that the multiplexed digital signal output at 63 is uniform, thereby enhancing picture quality.

Still referring to the AVPC card 36, the 15 digitized input signal (to the signal equalizer 60) is 12 bits. However, the signal equalizer, in correcting signal gain and level differences, subsequently increases the digital signal output to 19 significant bits. As the signal contains only 15 bits of usable data, saturation detector 64 sets all data above the 15 bit range to a saturation level of 1 and all data below the 15 bit range to 0. Therefore, only the useful data within the 15 bit range is output to the SHPC card 38. The AVPC card also includes a timing/control processing unit 68 implementing the clocks 53 and line timing for clocking multiplexed signals from the S/HMUX during a sample period. Preferably, the line timing HCLK has a clock sample rate of 240 TDI channels per sample period plus 16 clocks dead time. However, this rate may be varied by the present invention as necessary as will be described below. The AVPC card also includes an interface 70 that connects AVPC card components to a system microprocessor bus 72.

Turning now to the SHPC card 38, the signal output from the saturation detector 64 is input into a look-up table 74. Generally, the output dynamic range of the digitizing and signal equalizing process is greater than the maximum dynamic range of traditional image displays. Moreover, there are areas of the output dynamic range that have minimal or no information. Therefore, the output signal of the digitizing and signal equalizing process is input into a look-up table 74 to compress the information into display dynamic range. The look-up table provides a programmable method of mapping the larger input dynamic range into the smaller output dynamic range. The mapping can be varied continuously either based on manual input from a system operator or based on an automatic histogram-based method. Parallel to the look-up table, the video is input to a histogram/accumulator 80. The histogram/accumulator 80 performs certain programmable functions, such as line summing, line grabbing, and histogramming of the digitized information. The look-up table 74 converts the 15 bit signal output from the saturation detector to an 8 bit output signal. The look-up table is preferably a 32 k×8 Random Access Memory (RAM) well known in the art such as Integrated Device Technology Model No. IDT71256, and can be varied continuously either based on manual input from a system operator or based on an automatic gain algorithm. The 15 bit signal output from the saturation detector is also converted to a 10 byte signal through a video shifter 76.

Also located on the SHPC card 38 are microprocessors 82 and 84. As discussed above, many functions are under microprocessor control. The microprocessor 84 performs numerous control-related operations associated with the control panel(s), controls the TDI clock rate for EFL compensation and histogram/accumulator function, and calculates the level equalization value for each pixel, the global level control value, and the look-up table values. The microprocessor 82 performs more system-based processing related functions and is operatively associated with a RAM 86 and an EEPROM 90. Both the RAM 86 and the EEPROM 90 store the software based commands controlling the electronic effective focal length compensator according to the preferred embodiment of the present invention, the function of which will be described in greater detail below.

Referring now to the MOSC card 40, the 8 bit output signal from the look-up table 74 is input through pixel buffers 92, 94 and output to both the gunner display 19 and the commander display 21 after being scan-converted via a frame memory and converted back to an analog signal through the digital to analog converter 96. Symbology may also be switched in for any pixel in the image signal by symbology processor 98 before being output through the digital analog converter 96. Such symbology data may include status indications, sighting cross hairs and instructional text at the bottom of either the commander or the gunner display.

Referring to FIGS. 7A–7B, a schematic block diagram of the field programmable gate array (FPGA) shown in FIG. 6 is shown generally at 100. The FPGA 100 includes two main subarrays: a counter subarray 102 and a microprocessor/FPGA command subarray 104.

Referring to the counter subarray 102, video input line 108 inputs the fifteen bit video input signal from the saturation detector 64. A look-up table counter loop 110 is implemented for loading data into the LUT and is implemented every 7.5 Hertz=133 msec as data is loaded into the LUT, as will be described below. The output of the LUT counter loop 110 is multiplexed with the FLIR video input signal at multiplier 111 and output on line 113.

In addition, line sync and field active lines, indicated generally at 112, are input from the system timing generator (FIG. 6). In particular, the input lines 112 control operation of a column counter 115 and a row counter 116. The column and row counters 115, 116 are selectively enabled to both provide control addressing to the histogram 80. The row counter increments by 1 from 0–239 as each line of video signal data is loaded into the LUT, and resets every data load line. The column counter increments by 1 at every reset of the row counter 116. The column counter signal is output on line 118, while the row counter signal is output on line 120. The output lines 118, 120 are then input into a multiplexer 122, along with the multiplexed video data input signal line 113. When activity ceases at the detector array, i.e., when the detector array does not detect energy from a target scene, the input lines 112 relay this information to the counters 115, 116, and the counters are reset.

The look-up table address counter loop 110, the column counter 115 and the row counter 116 outputs are multiplexed together at the multiplexer 122. A histogram MUX select line, indicated at 124, inputs a histogram mode control signal from the microprocessor 82 into the multiplexer to control the histogram mode control signal output on line 126. Table 1 below indicates the various histogram MUX select command inputs and the corresponding output command signal output at 126:

| Histogram MUX Select | Mode |
|---|---|
| 00 | Histogram Function |
| 01 | Line Sum Function |
| 10 | Line Grab Function |
| 11 | Asynchronous 24 Function |

In operation, the hardware-implemented counter subarray 102 is controlled by software programmed into the RAM 86 to enable the histogram chip 80 to perform histogramming, line summing, and line grabbing functions according to specific system needs as dictated by the microprocessor 82. Upon receiving a 00 signal from the processor 82, the multiplexer 122 outputs a HISTOGRAM command signal on line 126 that switches the histogram chip 80 into a histogramming mode. The histogram chip, when in a histogramming mode, generates a histogram of the video signal data. Video signal data is processed through the LUT. The processor reads this histogram data and utilizes it in differentiating between useful video data and discardable data in video signal data compression applications.

Upon receiving a 01 signal from the processor 82, the multiplexer 122 outputs a LINE SUM command signal on line 126 to the histogram chip that switches the histogram chip into a line summing mode. In line sum mode, the histogram sums data across each of the 240 lines of the video signal data output from the detector array. Therefore, at the address level, the row one address would point to the first row of pixels as shown in subarray 26a or 26b. The histogram 80 sums the video data being input into the histogram with the video data previously stored in the row one location. The histogram chip, when operating in a line summing mode, utilizes data from the row counter 116 as video signal data is loaded into the LUT for applications in conjunction with the processor, such as correction of non-uniformities in each of the 240 TDI channels output from the detector array 26.

Upon receiving a 10 signal from the processor, the multiplexer 122 outputs a LINE GRAB command signal on line 126 that switches the histogram into a line grabbing mode. In line grabbing mode, the histogram chip captures one of the 240 lines as the column counter is incremented on each input line. Thus, as the address is incremented by one column, the data from the previous column is input into the address of the column and the processor 84 reads the data out of the histogram chip. The histogram chip, when operating in a line grabbing mode, utilizes data from the column counter 115 as video signal data is loaded into the LUT and the video input signal in conjunction with the processor for performing functions such as pixel alignment applications to enhance output video signal quality. For example, if the histogram grabs two adjacent video lines, and detects that the pixels in line X are not aligned with the pixels in line X+1, the processor can execute a pixel alignment function to correct the detected problem (effective focal length compensation).

Upon receiving a 11 signal from the processor 82, the multiplexer 122 outputs a PROCESSOR READ command to the histogram chip, subsequently switching the histogram chip into a mode in which data accumulated by the histogram is read by the processor and used for one of the above mentioned applications.

The FPGA/microprocessor subarray 104 is coupled to the data bus of the microprocessor at line 130. Through the line 130, the microprocessor inputs START, STOP and MOST SIGNIFICANT BIT data load functions to control loading of data into the look-up table 74 through the registers 132a–132c. Register outputs 134a–134c are coupled to the look-up table address counter loop 111 as indicated in the counter subarray 102 at 136a and 136b. In addition, the subarray 104 includes a command register 132d having an input coupled to the input line 130 and an output line 134d that is input, along with the outputs 134a–134c, into a multiplexer 140 for processor read capability. The command register 132d functions as an input/output port and functions to initialize the histogram 80 in whatever mode is input on the histogram MUX select line 124. The registers 134a–134d enable the processor to issue commands to the FPGA to load a piece of data into the rows and columns in the LUT 74.

The most significant bit register 132c is implemented based on the assumption that the seven most significant bits of the START and STOP address registers are equal. The most significant bit register 132c enables the system to identify into which bank of memory within the LUT data is being loaded and enables this bank of memory only to be block loaded up to 1024 locations.

Figure 8:
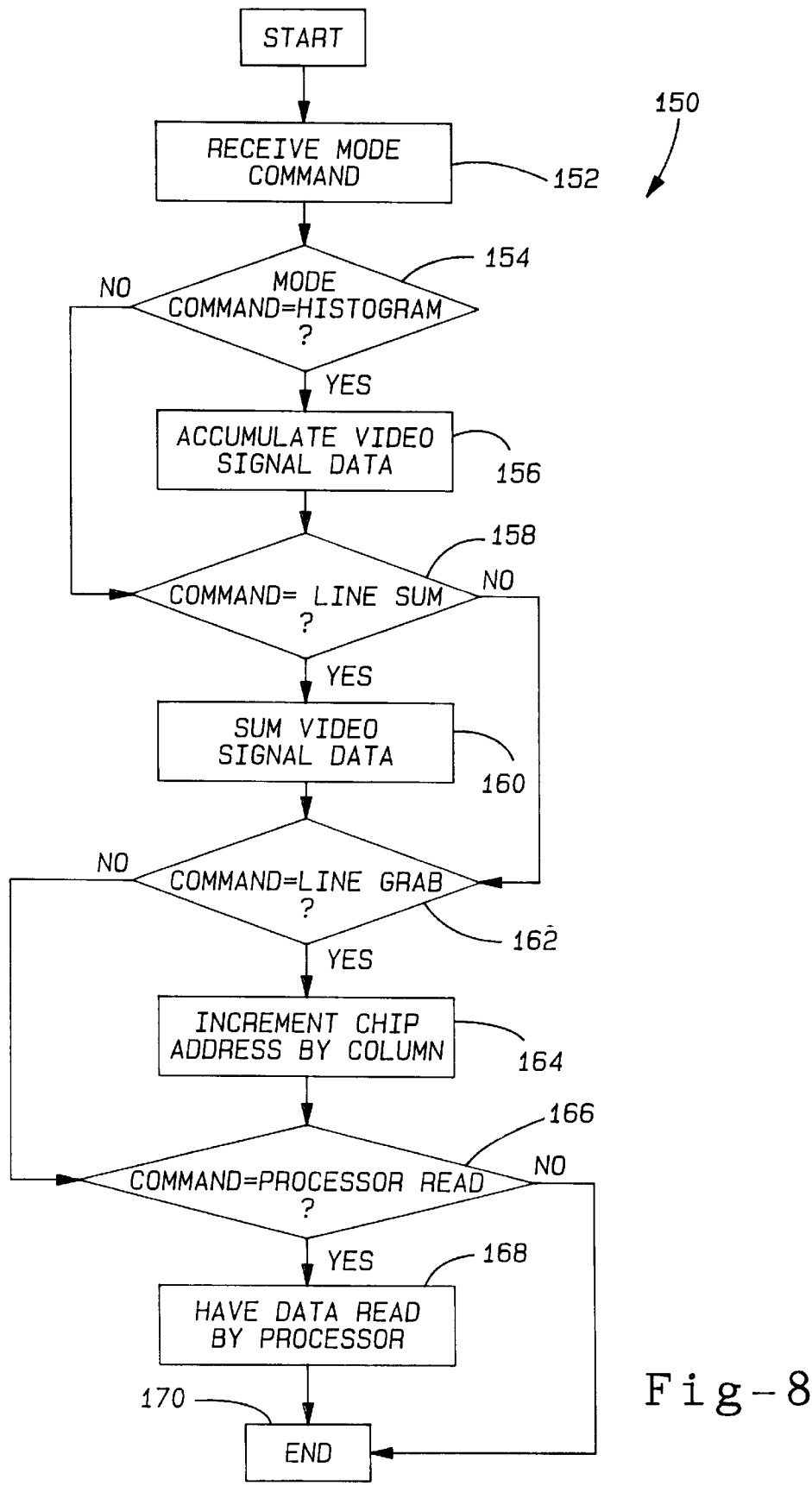
FIG. 8 illustrate a flow diagram of the preferred method of implementation of the histogram chip according to a preferred embodiment of the present invention.

Referring now to FIG. 8, a flow diagram illustrating the preferred method of implementation of the histogram chip according to the present invention is shown generally at 150. Initially at step 152, the histogram chip 80 receives a mode command from the processor 82. At step 154, if the mode command places the histogram chip in histogramming mode, the histogram chip accumulates input video signal data at step 156 for video signal compression purposes. If at step 154 the command is not a HISTOGRAM mode command, the method advances to step 158. If the command places the chip in a line summing mode at step 158, then at step 160 the histogram chip address sums video signal data in row by row fashion for each of the 240 lines of video data for correction of channel-to-channel imbalances. If at step 158 the command does not place the chip in a line summing mode, the method advances to step 162. If the command places the chip in a LINE GRAB mode at step 162, then the histogram chip address increments across the input video signal data on a column by column level at step 164 for pixel alignment purposes for each of the 240 output video lines on the displays 19, 21. If, at step 162, the histogram chip is not placed in a line grabbing mode, the method advances to step 166. At step 166, the histogram chip determines if the command places the chip in an ASYNCHRONOUS PROCESSOR READ mode. If so, then at step 168 the histogram chip switches to a mode in which data is read from the chip by the processor 82. If the method determines that none of the above histogram modes of operation is selected, the application is ended at step 170 until the histogram chip receives a mode command from the processor at step 152, at which time the method is repeated.

Upon reading the foregoing detailed description, it should be appreciated that implementation of the multi-function time share histogram chip of the present invention eliminates the need and associated expense of hardware components previously necessary to separately implement line summing and line grabbing functions, which are now incorporated in the histogram chip of the present invention. Thus, the histogram chip of the present invention reduces the area required for system implementation because of its many software driven components, and provides thermal imaging system flexibility and growth capability by eliminating the need for separate hardware components previously required to implement the line summing and line grabbing functions.

The histogram chip of the present invention also reduces system cost and complexity, while maintaining a high degree of overall system performance.

Various other advantages of the present invention will become apparent to those skilled in the art after having the benefit of studying the foregoing text and drawings, taken in conjunction with the following claims.

What is claimed is:

1. A method for controlling an operational mode of a time shared histogram chip, comprising the steps of:

inputting a video signal on a video signal line;

providing a processor for outputting a histogram chip command signal on a command signal line;

providing hardware counter means for selectively providing data to said histogram chip for each of said histogram chip operational modes on a command signal line;

multiplexing said command signal line and said counter signal line with said video signal line;

outputting said multiplexed signal to said histogram chip;

said histogram chip operating in a histogramming mode in response to a HISTOGRAM command signal from said processor;

said histogram chip operating in a line summing mode in response to a LINE SUM command from said processor;

said histogram chip operating in a line grabbing mode in response to a LINE GRAB command from said processor; and said histogram chip operating in a processor read operational mode in response to an ASYNCHRONOUS mode command signal from said processor.

2. A system for controlling an operational mode of a time shared histogram chip, said system comprising:

means for inputting a video signal on a video signal line;

processor means for outputting a histogram chip command signal on a command signal line;

counter means for selectively providing data to said histogram chip for each of said histogram chip operational modes on a command signal line;

means for multiplexing said command signal line and said counter signal line with said video signal line; and means for outputting said multiplexed signal to said histogram chip, whereby said histogram chip operates in a histogramming mode, a line summing mode, a line grabbing mode and a processor read mode in response to a HISTOGRAM command, a LINE SUM command, a LINE GRAB command and a ASYNCHRONOUS mode command from said processor means, respectively.

* * * * *